Patented May 11, 1943

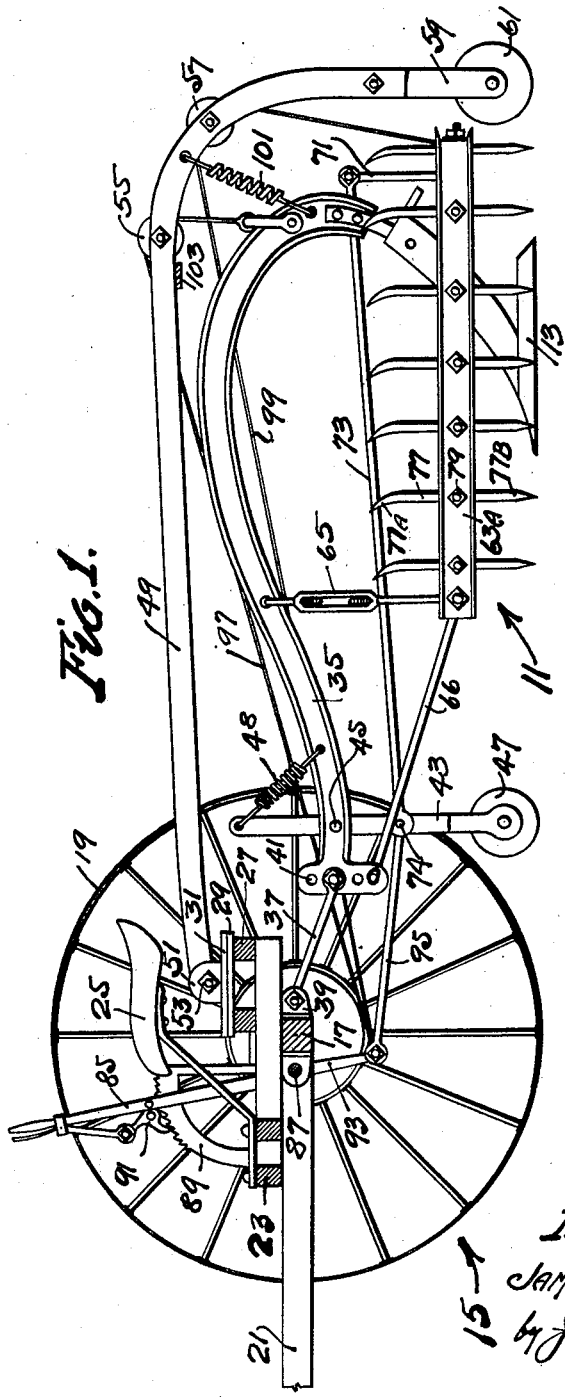

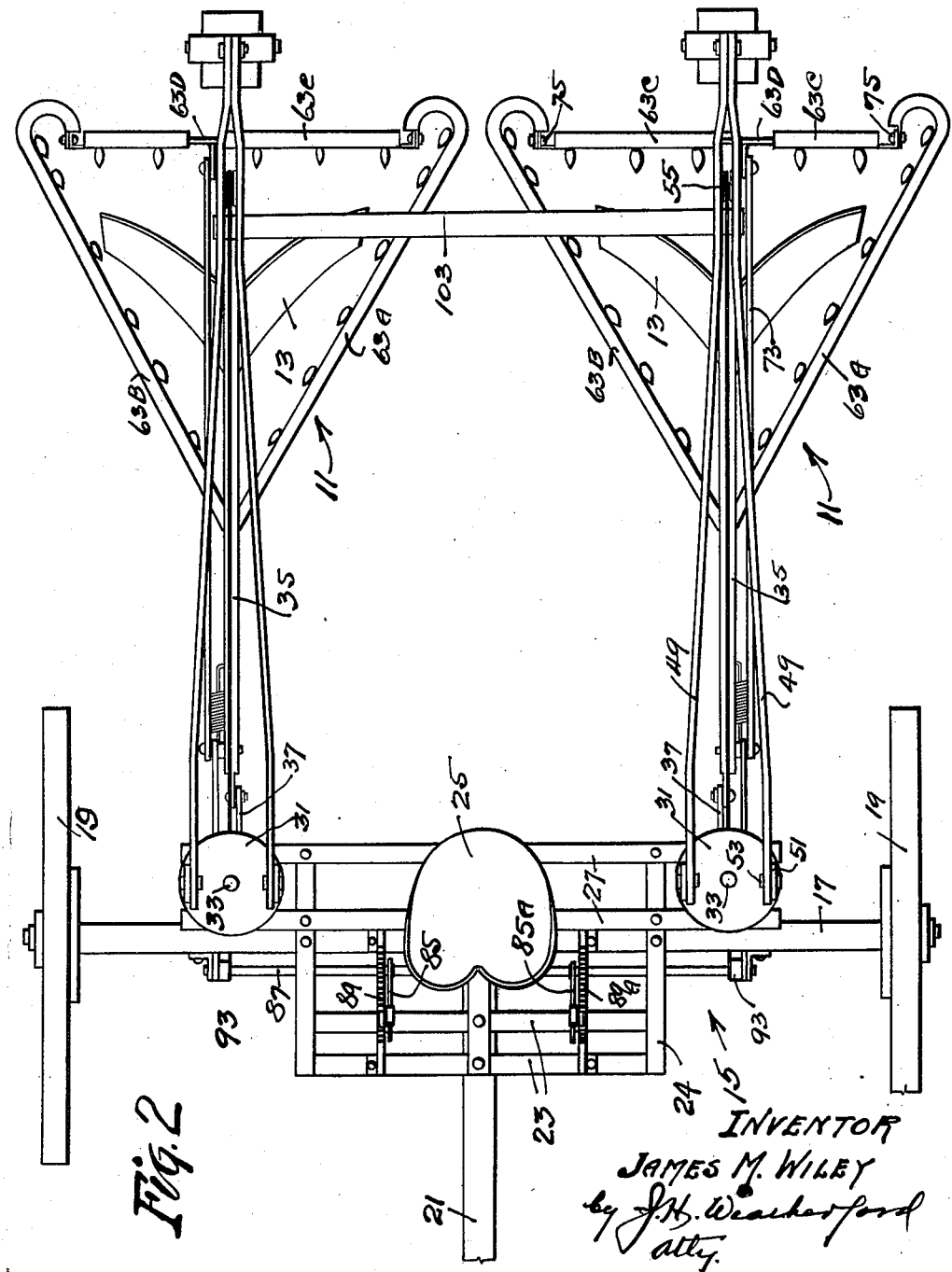

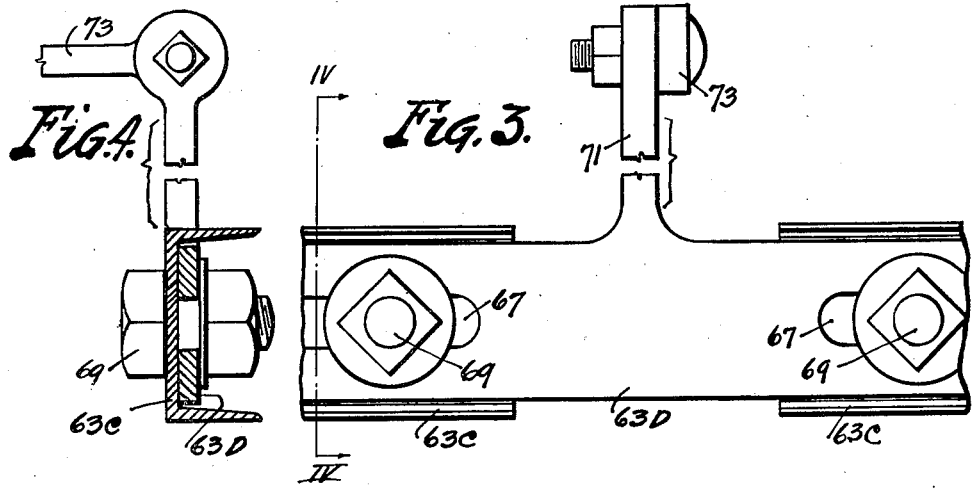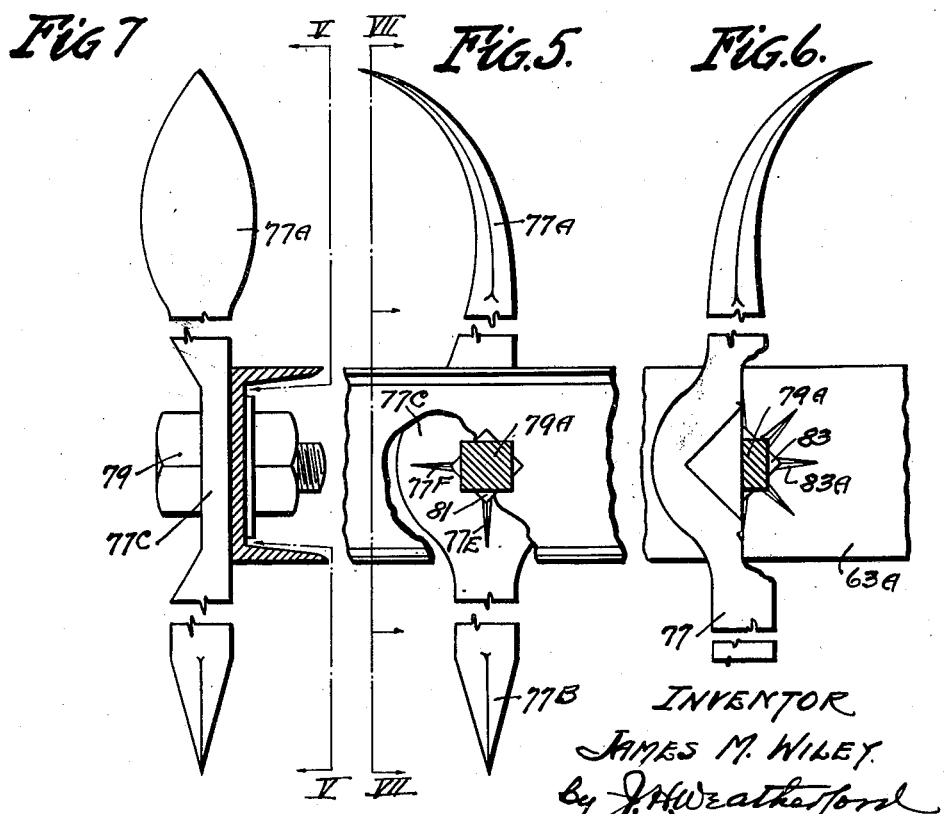

2,318,981

UNITED STATES PATENT OFFICE 2,318,981

COMBINED CULTIVATOR AND HARROW

James M. Wiley, Memphis, Tenn.

Application April 26, 1941, Serial No. 390,435

10 Claims. (Cl. 97—8)

This invention relates to an improved agricultural implement in which harrows and cultivators are combined into a single cooperative implement.

The objects of the invention are:

To provide an implement of this class which is adapted to cultivate a plurality of rows at one time and which is capable of adjustments and manipulation; to properly coordinate harrow action and cultivator action.

A further object is to make the parts of the implement relatively adjustable to vary the type of action accomplished, particularly by the harrow.

The means by which the foregoing and other objects are accomplished and the method of their accomplishment will readily be understood from the following specification upon reference to the accompanying drawings, in which:

Fig. 1 is a sectional side elevation of a typical form of the implement.

Fig. 2 is a corresponding plan.

Fig. 3 is an enlarged rear elevation of a fragmentary central portion of one of the harrows; and Fig. 4 a sectional elevation taken as on the line IV—IV of Fig. 3.

Fig. 5 is an elevation of a fragmentary portion of the harrow frame, in part broken away, showing the method of tooth attachment, the attaching bolt being in section on the line V—V of Fig. 7; and Fig. 6 a view of the opposite side of the same portion of the frame with a portion of the tooth broken away.

Fig. 7 is a transverse sectional elevation taken as on the line VII—VII of Fig. 5.

Referring now to the drawings in which the various parts are indicated by numerals:

The implement comprises two or more units, two only being shown, each unit including a harrow, generally designated by the numeral 11, and a cultivator or sweep 13, the units being independently attached to a traction device 15 which may be pulled by an animal, or animals, or by a tractor as may be desired.

The traction device includes an axle 17 and suitable wheels 19. As here shown the axle 17 carries a tongue 21 to which are suitably bolted or otherwise secured transverse members 23 forward of the axle which may carry a seat 25, and members 24 parallel with the tongue which carry an additional pair of cross members 27 rearward of the axle. The members 27 carry the lower plates 29 of fifth wheel structures, the upper plates 31 of these structures being pivotally mounted on the lower plates and secured thereto respectively, each as by a bolt 33, and there being one such fifth wheel structure for each unit.

The units are disposed rearward of the axle 17.

Each unit includes a sweep beam 35 coupled at its forward end by suitable linkage 37 and bracket 39 to the rear of the axle. The beam 35 may be provided with holes 41 to facilitate adjustment of the vertical angle of pull of the link 37 on the forward end of the beam.

The forward end of the beam is additionally supported by a post 43 which is pivotally attached as by a bolt 45 to the beam. The post 43 carries at its lower end a suitably journalled wheel or roller 47. The upper end of the post extends above the beam and is connected downwardly and rearwardly with the beam by a tension spring 48 adapted to resiliently hold the post in upright position and against rearward displacement due to forward movement of the device.

A truss 49 is secured to and supported at its forward end by the upper plate 31 of the related fifth wheel and extends rearwardly, the truss preferably being made up of a pair of bars, both designated by the numeral 49 in plan, which bars are spaced apart and respectively attached as through brackets and bolts 51, 53 to the fifth wheel plate. The side members making up the truss 49 are preferably brought into substantial parallelism above the rear of the sweep beam 35 and have journalled therebetween rollers 55, 57 on suitable bolts or pins and thence continue downward and are spread apart to form a yoke 59 in which is suitably journalled a wheel or roller 61 which supports the rear end of the truss.

The harrow 11 is of triangular shape having side bars 63—A, 63—B and a rear bar 63—C, the side bars meeting in a point substantially beneath the sweep beam 35, being supported from the beam by a turnbuckle adjusted link 65, and being tractively connected to the forward end of the beam by a link 66. The rear bar 63—C of the harrow is in three parts to provide adjustment in width of the harrow. The center portion 63—D, shown in detail in Figs. 3 and 4, is provided with slots 67 and is adjustably clamped to the rear bar parts 63—C by bolts 69 to permit adjustment of the length of the bar and width of the rear end of the harrow. Preferably an arm 71 extends upward from the bar portion 63—D, the bar being connected at its upper end by a link 73 and pin 74 to the post 43. The ends of the rear bar 63—C are pivotally connected as by bolts 75 to inwardly curved end portions of the side bars 63—A and 63—B, whereby movement of the arm 71 under angular shift of the post 43 will rock the rear bar 63—C about its longitudinal axis.

The harrow is provided with teeth 77 which are attached to the side and rear bars by bolts 79, having square shanks 79—A. Preferably these teeth, as shown in Figs. 5, 6 and 7, are each flattened and shaped at one end to form a cultivator tooth section 77—A and at the opposite end are pointed to form the usual harrow tooth section 77—B. The center portion 77—C of each tooth is flattened and provided with a star-shaped hole 81 adapted to fit the square shank 79—A of the bolt at various positions 45 degrees apart. The teeth may also be provided with lugs 77—E, 77—F radiating respectively lengthwise and crosswise from the hole 81.

The harrow frame members, as the member 63—A, may likewise be provided with star-shaped holes 83, or these holes may be square, also adapted to receive the square shank 79—A of the bolt in positions 45 degrees apart and is provided around each bolt hole with grooves 83—A radiating at 45 degree intervals and adapted to receive the lugs 77—E and 77—F of the teeth, the construction above described permitting attachment of the teeth with either the harrow points or the cultivator points extending straight downward or with either of these points forwardly or rearwardly inclined at an angle of 45 degrees and the rocking movement of the rear bar 63—C of the harrow permitting a similar rearward shift of the harrow or cultivator ends of the teeth, as the case may be.

Mounted on the traction device 15 is a lever 85 which is secured on a transverse shaft 87 and is provided with a typical ratchet arch 89 and pawl 91. Also secured on the shaft 87 is a depending arm 93 which is connected as through a link 95 and the pin 74 to the post 43, the lower end of the post being shiftable forward by rearward motion of the upper end of the arm 85 or rearward by reverse motion of that arm.

The arm 93 is also connected by a cable 97 which passes over the pulley 55 and downward to the rear end of the sweep beam 35 and is connected by a similar cable 99 which passes over the pulley 57 and downward to the rear end of the harrow 11 so that rearward movement of the upper end of the arm 85 will raise both the rear end of the sweep beam and the rear end of the harrow.

The shaft 87 may extend continuously from side to side of the traction unit and be used to concurrently control the related parts of both units, or it may be cut in two and an additional lever 85—A and arc 89—A, Fig. 2, used to operate one of the halves, thus permitting independent control of each unit.

101 is a tension spring interposed between the truss 49 and the rear end of the sweep beam to balance in part the weight of such beam's rear end. The truss frames of the two units are preferably transversely braced by a member 103 extending from one to the other thereof.

It will be noted that the two unit device shows a central tongue which permits two draft animals to be used, these animals being positioned respectively each directly in front of a unit. Should it be desired to use these units and one animal only the central tongue would be eliminated and two spaced tongues used, these being located, as is the tongue shown, centrally between units. Or, if tractor power is to be used a centrally located but short tongue is retained, it being then directly in front of the center unit and the tractor hitch made directly to such tongue. The double and single tree hitch for animals or the hitch for tractor being well known, such devices are not here shown.

I claim:

1. An agricultural implement of the character described, comprising a traction device, including an axle and spaced wheels, and a plurality of cultivating units independently attached thereto, each said unit including a truss frame attached to and supported at its forward end by said device, and having at its rear end a suitably journalled supporting roller, a sweep beam carrying an attached sweep, and a harrow surrounding said sweep, both sweep and harrow underlying said truss, a traction link connecting the forward end of said beam with said traction device, and a second traction link connecting the forward ends of said beam and said harrow, means supporting the forward end of said harrow from said beam, and means respectively supporting the rear ends of said beam and said harrow from said truss.

2. An agricultural implement of the character described, comprising a traction device, including an axle and spaced wheels, and a plurality of cultivating units independently attached thereto, each said unit including a truss frame attached to and supported at its forward end, by said device, and having at its rear end a suitably journalled supporting roller, a sweep beam carrying an attached sweep, and a harrow surrounding said sweep, both sweep and harrow underlying said truss, a traction link connecting the forward end of said beam with said traction device, and a second traction link connecting the forward ends of said beam and said harrow, means supporting the forward end of said harrow from said beam, a pair of pulleys carried by said truss, a manually operable lever on said device, a pair of cables operably connected to said lever, and respectively extending over said pulleys and downward into operable connection with said harrow and said beam.

3. An agricultural implement of the character described, comprising a traction device, including an axle and spaced wheels, and a plurality of cultivating units independently attached thereto, each said unit including a truss frame attached to and supported at its forward end, by said device, and having at its rear end a suitably journalled supporting roller, a sweep beam carrying an attached sweep, and a harrow surrounding said sweep, both sweep and harrow underlying said truss, a traction link connecting the forward end of said beam with said traction device, a second traction link connecting the forward ends of said beam and said harrow, a post pivotally connected adjacent the forward end of said beam and extending downward therefrom, a post-supporting roller suitably journalled in the bottom end of said post, a manually operable lever on said traction device and a link operably connecting said post and said lever and effective to displace said post from supporting position, means supporting the forward end of said harrow from said beam, and means respectively supporting the rear ends of said beam and said harrow from said truss.

4. An agricultural implement of the character described, comprising a traction device, including an axle and spaced wheels, and a plurality of cultivating units independently attached thereto, each said unit including a truss frame attached to and supported at its forward end, by said device, and having at its rear end a suitably journalled supporting roller, a sweep beam carrying an attached sweep, and a harrow surrounding said sweep, both sweep and harrow underlying said truss, a traction link connecting the forward end of said beam with said traction device, a second traction link connecting the forward ends of said beam and said harrow, a post pivotally connected adjacent the forward end of said beam and extending downward therefrom, a supporting roller suitably journalled in the bottom end of said post, a manually operable lever on said traction device, a link operably connecting said post and said lever and effective to displace said post from supporting position, means supporting the forward end of said harrow from said beam, a pair of pulleys carried by said truss, and cables connected to said lever adjacent said post-link connection and extending each over a said pulley and respectively to supporting attachment with the rear ends of said beam and said harrow.

5. An agricultural implement of the character described, comprising a traction device, including an axle and spaced wheels, a plurality of cultivating units independently attached thereto, a shaft disposed along said axle and suitably supported thereby, a manually operable lever secured to said shaft, and a plurality of arms conforming in number and each relating to a said unit and secured to said shaft; each said unit including a truss frame attached to and supported at its forward end, by said device, and having at its rear end a suitably journalled supporting roller, a sweep beam carrying an attached sweep, and a harrow surrounding said sweep, both sweep and harrow underlying said truss, a traction link connecting the forward end of said beam with said traction device, and a second traction link connecting the forward ends of said beam and said harrow, means supporting the forward end of said harrow from said beam, a pair of pulleys carried by said truss, a pair of cables, respectively connected to the rear ends of said harrow and of said beam and extending upward each over a said pulley and forwardly toward said traction device, both said cables being connected to the related said arm of its unit, whereby to manually effect concurrent raising and lowering of the rear ends of said beams and said harrow.

6. An agricultural implement of the character described, including traction means, and a cultivating unit attached thereto, said unit including a frame attached to and supported at its forward end by said traction means, and having at its rear end ground-contacting supporting means, a beam, carrying attached plowing means, and a harrow surrounding said plowing means, both said plowing means and said harrow underlying said frame, linkage connecting the forward end of said beam with said traction means, and a second linkage connecting the forward end of said harrow to said traction means, means supporting the forward end of said harrow from said beam, and means respectively supporting the rear ends of said beam and said harrow from said frame.

7. An agricultural implement of the character described, comprising traction means, and a cultivating unit attached thereto, said unit including a frame attached to and supported at its forward end, by said traction means, and having at its rear end ground-contacting supporting means, a beam, carrying attached plowing means, and a harrow surrounding said plowing means, both said plowing means and said harrow underlying said frame, linkage connecting the forward end of said beam with said traction means, and linkage connecting the forward end of said harrow to said traction means, means supporting the forward end of said harrow from said beam, a pair of pulleys carried by said frame, a manually operable lever on said traction means, a pair of cables operably connected to said lever, and respectively extending over said pulleys and downward into operable connection with the rear ends of said harrow and said beam.

8. An agricultural implement of the character described, comprising traction means, and a cultivating unit attached thereto; said unit including a frame attached to and supported at its forward end by said traction means, and having at its rear end ground-contacting supporting means, a beam, carrying attached plowing means, and a harrow surrounding said plowing means, both said plowing means and said harrow underlying said frame, linkage connecting the forward end of said beam with said traction device, linkage connecting the forward end of said harrow to said traction means, a post pivotally connected adjacent the forward end of said beam and extending downward therefrom, a post-supporting roller suitably journalled in the bottom end of said post, a manually operable lever on said traction means, and linkage connecting said post and said lever and effective to displace said post from supporting position, means supporting the forward end of said harrow from said beam, and means respectively supporting the rear ends of said beam and said harrow from said frame.

9. An agricultural implement of the character described, including traction means, and a plurality of cultivating units independently attached thereto, each said unit including a frame attached to and supported at its forward end by said traction means, and having at its rear end ground-contacting supporting means, a beam, carrying attached plowing means, and a harrow surrounding said plowing means, both said plowing means and said harrow underlying said frame, linkage connecting the forward end of said beam with said traction means, and a second linkage connecting the forward end of said harrow to said traction means, means supporting the forward end of said harrow from said beam, and means respectively supporting the rear ends of said beam and said harrow from said frame.

10. An agricultural implement of the character described, comprising traction means, and a plurality of cultivating units independently attached thereto, each said unit including a frame attached to and supported at its forward end, by said traction means, and having at its rear end a suitably journalled supporting-wheel means, a beam, carrying attached plowing means, and a harrow surrounding said plowing means, both said plowing means and said harrow underlying said frame, linkage connecting the forward end of said beam with said traction means, linkage connecting the forward end of said harrow to said traction means, a manually operable lever on said traction means; means supporting the forward end of said harrow from said beam, a pair of pulleys carried by said frame, and cables connected to said lever and extending each over a said pulley and respectively to supporting attachment with the rear ends of said beam and said harrow.

JAMES M. WILEY.